(12) United States Patent
Mottin et al.

(10) Patent No.: US 11,397,901 B2
(45) Date of Patent: Jul. 26, 2022

(54) METHOD AND SYSTEM FOR PERCEIVING PHYSICAL BODIES

(71) Applicant: COMMISSARIAT A L'ENERGIE ATOMIQUE ET AUX ENERGIES ALTERNATIVES, Paris (FR)

(72) Inventors: Julien Mottin, Saint Ismier (FR); Diego Puschini Pascual, Meylan (FR); Tiana Rakotovao Andriamahefa, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 1112 days.

(21) Appl. No.: 15/753,540

(22) PCT Filed: Sep. 22, 2016

(86) PCT No.: PCT/EP2016/072530
§ 371 (c)(1),
(2) Date: Feb. 19, 2018

(87) PCT Pub. No.: WO2017/050890
PCT Pub. Date: Mar. 30, 2017

(65) Prior Publication Data
US 2018/0247216 A1 Aug. 30, 2018

(30) Foreign Application Priority Data
Sep. 22, 2015 (FR) ........................................ 1558919

(51) Int. Cl.
*G06N 7/00* (2006.01)
*G06F 17/18* (2006.01)
(Continued)

(52) U.S. Cl.
CPC ............. *G06N 7/005* (2013.01); *G01S 13/04* (2013.01); *G01S 13/86* (2013.01); *G06F 17/18* (2013.01); *G06K 9/629* (2013.01); *G06V 20/58* (2022.01)

(58) Field of Classification Search
CPC ......... G06N 7/005; G01S 13/04; G01S 13/86; G06F 17/18; G06K 9/629
See application file for complete search history.

(56) References Cited

U.S. PATENT DOCUMENTS

| 8,744,744 B2* | 6/2014 | Takagi | G01S 17/89 |
| | | | 701/301 |
| 9,429,650 B2* | 8/2016 | Zeng | G01S 13/931 |
| 2014/0035775 A1 | 2/2014 | Zeng et al. | |

FOREIGN PATENT DOCUMENTS

| DE | 10 2009 007395 A1 | 10/2009 |
| WO | 2007/028932 A1 | 3/2007 |

OTHER PUBLICATIONS

Mishra, et al., "Recursive Goal Seeking Algorithm for reactive navigation in autonomous rover systems", 2012 IEEE International Conference on Computational Intelligence and Computing Research, Dec. 18, 2012.

(Continued)

*Primary Examiner* — Bryan Bui
(74) *Attorney, Agent, or Firm* — BakerHostetler

(57) ABSTRACT

A method for perceiving physical bodies comprises the following steps: a) acquisition of a plurality of distance measurements of the physical bodies, arising from one or more sensor; b) application of an inverse sensor model on an occupancy grid to determine a probability of occupancy of a set of cells of the grid; and c) construction of a consolidated occupancy grid by fusion of the occupancy probabilities estimated during step b); wherein the inverse sensor model is a discrete model, associating with each cell of the (Continued)

corresponding occupancy grid, and for each distance measurement, a probability class chosen inside one and the same set of finite cardinality and identified by an integer index; and wherein step c) is implemented by means of integer computations performed on the indices of the probability classes determined during said step b). A system for perceiving physical bodies is also provided.

15 Claims, 8 Drawing Sheets

(51) Int. Cl.
    *G01S 13/04*     (2006.01)
    *G01S 13/86*     (2006.01)
    *G06V 20/58*     (2022.01)
    *G06K 9/62*     (2022.01)

(56) References Cited

OTHER PUBLICATIONS

Ascenso, et al., "Lossless compression of binary image descriptors for visual sensor networks", 2013 18th International Conference on Digital Signal Processing (DSP), 2013.

Einhorn, et al., "Finding the adequate resolution for grid mapping—Cell sizes locally adapting on-the-fly", 2011 IEEE International Conference on Robotics and Automation, 2011.

T. Rakotovao et al., "Real-time power-efficient integration of multi-sensor occupancy grid on many-core," 2015 IEEE International Workshop of Advanced Robotics and its Social Impacts, Jun. 30, 2015, pp. 1-6, XP032878066.

U. Scheunert et al., "Generalized Grid Framework for multi sensor data fusion," 2008 11th International Conference on Information Fusion, Jun. 30, 2008, pp. 1-7, XP031931930.

A. Elfes, "Occupancy Grids: A Stochastic Spatial Representation for Active Robot Perception," Proceedings of the 6th Conference Annual Conference on Uncertainty in Artificial Intelligence, Jul. 27, 1990, pp. 136-146, XP055291066.

T. Rakotovao et al., "Intelligent Vehicle Perception: Toward the Integration on Embedded Many-core," 6th Workshop on Parallel Programming and Run-Time Management Techniques for Many-Core Architectures, Sep. 16, 2015, pp. 2701313, XP055291194.

Julien Moras, "Grilles de perception evidentielles pour la navigation robotique en milieu urbain," PhD Thesis, Sep. 26, 2013, pp. 1-198, XP055291126.

K. Konolige, "Improved occupancy grids for map building," Autonomous Robots, vol. 4, 1997, pp. 351-367.

J. Adarve et al., "Computing occupancy grids from multiple sensors using linear opinion pools," Proceedings—IEEE International Conference on Robotics and Automation, 2012.

N.A., "Numerical Algorithms and Roundoff Errors," Jul. 28, 2014, XP055292485 <https://web.archive.org/web/20140728133805/http://www.sml.ee.upatras.gr/uploadedfiles/roundofferror.pdf>.

* cited by examiner

METHOD AND SYSTEM FOR PERCEIVING PHYSICAL BODIES

CROSS-REFERENCE TO RELATED APPLICATIONS

This application is a National Stage of International patent application PCT/EP2016/072530, filed on Sep. 22, 2016, which claims priority to foreign French patent application No. FR 1558919, filed on Sep. 22, 2015, the disclosures of which are incorporated by reference in their entirety.

FIELD OF THE INVENTION

The invention pertains to a method and a system for perceiving and estimating the position of physical bodies carrying out, in a manner which is efficient in terms of computational power and energy consumption, a multi-sensor fusion.

By "physical body" is meant any physical object or substance that exhibits individuality and can be detected and identified by an appropriate sensor. Thus, inanimate objects, be they natural or artificial, plants, animals, human beings, but also liquid or solid particles in suspension in the air, such as clouds, or indeed liquid or gaseous masses, are considered to be physical bodies.

The invention applies especially to the field of the navigation of robots, drones, autonomous vehicles, etc. and more generally to that of perception.

BACKGROUND

With the explosion of computation means that can be integrated into a robot, robotics applications have multiplied in recent years, from industrial production to home automation, from space and underwater exploration to mass-market toy drones. The tasks carried out in robotic applications have become progressively more complex, ever more often requiring robots to be able to move around in unknown environments; this has made it ever more important to develop means and techniques of perception, that is to say that allow the discovery and interpretation of surrounding space. An important application which uses perception in robotics is navigation, which consists in fixing a destination objective for a robot, and leaving it to arrive thereat while taking care to avoid unknown and potentially mobile obstacles; the robot is then responsible for planning its trajectory itself. A typical example, forming the subject of intense research, is the autonomous car.

To allow knowledge of the whole environment while limiting to the maximum the dead angles, and to alleviate any possible defect of a sensor, one generally has recourse to the integration of multiple sensors. When several sensors, possibly of different types, cover the same space, it is necessary to be able to combine the information extracted from each of them: one then speaks of multi-sensor fusion.

There exist two main families of perception techniques: geometric procedures, which are aimed at identifying the geometry of the objects of the surrounding space, and occupancy grid based procedures, which are aimed at determining whether a certain location is occupied by an obstacle (more generally, by a physical body). The invention pertains to occupancy grid based techniques.

The theoretical foundations of multi-sensor perception and fusion procedures based on occupancy grids are described in the article by A. Elfes, "Occupancy grids: a stochastic spatial representation for active robot perception" (Sixth Conference on Uncertainty in AI, 1990). This publication is not concerned with the practical implementation of the procedures, direct application of which would require complex floating-point computations.

The article by K. Konolige "Improved occupancy grids for map building" (Autonomous Robots, 4, 351-367, 1997), that by J. Adarve et al. "Computing occupancy grids from multiple sensors using linear opinion pools", (Proceedings—IEEE International Conference on Robotics and Automation, 2012) and that by T. Rakotovao et al. "Real-time power-efficient integration of multi-sensor occupancy grid on many core" (2015 International Workshop on Advanced Robotics and its Social Impact, Jun. 30, 2015) describe enhancements of the techniques based on occupancy grids. Here again, the implementation of these techniques requires massive recourse to floating-point computation.

Documents US 2014/035775, FR 2006/050860 and DE 102009007395 describe multi-sensor perception and fusion procedures and systems based on occupancy grids, applied to the autonomous driving of terrestrial vehicles. All these procedures require, for their implementation, floating-point computations.

However, recourse to floating-point computation demands considerable resources in terms of computational power, which are hardly compatible with the constraints specific to embedded systems. For the record, the floating-point format—defined by IEEE standard 754—represents a number by means of three elements: a sign (1 bit), a mantissa (23 or 52 bits) and an exponent (8 or 11 bits). Performing computations using numbers represented in floating point is much more complex (that is to say requires many more elementary operations) than performing computations on integers. This therefore requires the use of a faster processor and/or of a dedicated hardware accelerator, with an unfavorable impact in terms of cost, bulkiness and electrical consumption.

An environment of 20 m×50 m discretized into 100 000 cells of 10 cm×10 cm and two sensors operating at 25 Hz, are considered by way of example. If data fusion must be performed, in accordance with the prior art, by implementing the theory of A. Elfes by means of floating-point computations, the computational power required is of the order of 5-50 GFlops (billions of floating operations per second). If we consider a grid of 150 000 cells with 8 sensors operating at 50 Hz—assumptions which seem more realistic for applications in the automotive field—a need for 60-600 GFlops of computational power is obtained.

SUMMARY OF THE INVENTION

The invention is aimed at providing a procedure for perceiving physical bodies by multi-sensor fusion requiring fewer computational resources and, therefore, better adapted to embedded solutions. More particularly it is aimed:

on the one hand, at allowing the use of simple embedded computation devices, not necessarily supporting floating-point operations;

on the other hand, even in the case where floating-point computations would be supported, at reducing the energy consumption of the computation device, by avoiding or greatly limiting the actual recourse to such computations. Such a reduction in consumption is advantageous by itself; moreover, it makes it possible to reduce heating, thereby improving the robustness and the lifetime of the computation device, while relaxing the constraints in terms of thermal dissipation.

By way of example, the inventors have been able to note that the invention makes it possible to carry out the fusion on a digital system offering computational performance equivalent to that available in the ISO26262 ASIL-D certified platforms used in the automotive sector. This is not possible using the fusion techniques known from the prior art.

Hereinafter, the application to the perception of obstacles will be specifically considered, but the invention is in no way limited to this typical case. Other possible applications relate to the detection of clouds or precipitations, or indeed of concentrations of pollutants, or else the distribution and the movements of people in a public space. In all these cases, it is possible to detect physical bodies with the aid of sensors, to measure the distance thereof and to use the measurements to compute an occupancy grid.

A subject of the invention making it possible to achieve this aim is a method for perceiving physical bodies comprising the following steps, implemented by a computer or a dedicated digital electronic circuit:

a) Acquisition of a plurality of distance measurements of said physical bodies, arising from one or more sensors;

b) Application, to each said distance measurement, of an inverse model of the corresponding sensor on an occupancy grid providing a discretized spatial representation of an environment of said sensor, so as to determine a probability of occupancy by a physical body of a set of cells of said occupancy grid; and c) Construction of a consolidated occupancy grid, each cell of which exhibits an occupancy probability computed by fusing the occupancy probabilities estimated during step b);

characterized in that each said inverse sensor model is a discrete model, associating with each cell of the corresponding occupancy grid, and for each distance measurement, a probability class chosen inside one and the same set of finite cardinality, each said probability class being identified by an integer index; and in that, during said step c), the probability of occupancy of each cell of the consolidated occupancy grid is determined by means of integer computations performed on the indices of the probability classes determined during said step b).

Another subject of the invention is a system for perceiving physical bodies comprising:

at least one input port for receiving a plurality of signals representative of distance measurements of said physical bodies, arising from one or more sensors;

a data processing module configured to receive as input said signals and to use them to construct a consolidated occupancy grid by applying a method such as defined hereinabove; and at least one output port for a signal representative of said consolidated occupancy grid.

BRIEF DESCRIPTION OF THE DRAWINGS

Other characteristics, details and advantages of the invention will emerge on reading the description given with reference to the appended drawings, which drawings are given by way of example and illustrate respectively.

DETAILED DESCRIPTION

In the detailed description which follows, reference will be made to the case of the perception of obstacles. However, everything that is described applies more generally to the perception of physical bodies of any sort.

Usually, sensors employed for navigation advise regarding the distance of surrounding obstacles; one then speaks of distance sensors. To account for the precision of a sensor, for possible error thereof or for its resolution, a probabilistic model is introduced. The idea is that a measurement output by the sensor does not necessarily indicate the exact distance between the obstacle and the sensor, and that consequently it is appropriate to reason regarding the probability that the obstacle is at a given distance knowing the response of the sensor.

Figure 1:
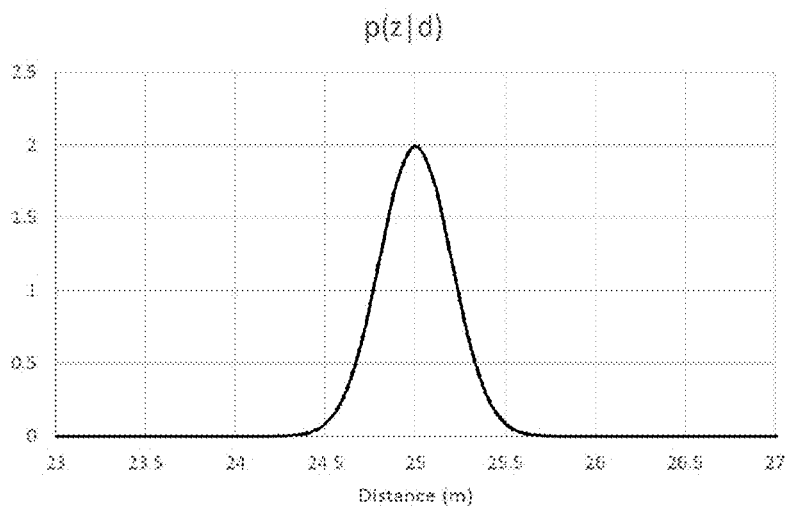
FIG. 1, the notion of "direct" model of a distance sensor.

If d denotes the real distance between an obstacle and the sensor, and z the output of the sensor, one is concerned with the conditional probability density function $p(z|d)$ which models the relationship between the real position of an obstacle and its estimation seen by the sensor ("direct model"). FIG. 1 presents an exemplary direct model of a sensor; a linear space 50 m long is considered and it is assumed that an obstacle is situated at d=25 m from the sensor. For a sensor with an error modelable by a Gaussian function, the most probable response z will be close to 25 m, but other values will be possible, with a probability density defined by the curve. In the case of an ideal sensor, we would have $p(z|d)=\delta(z-d)$, where $\delta$ is a Dirac Delta, and the measurement would always be equal to the true distance. The direct model of a sensor can be determined in an experimental manner; typically it can be constructed on the basis of data provided by the constructor (in the Gaussian case, the value of the standard deviation suffices to characterize the model).

Figure 2:
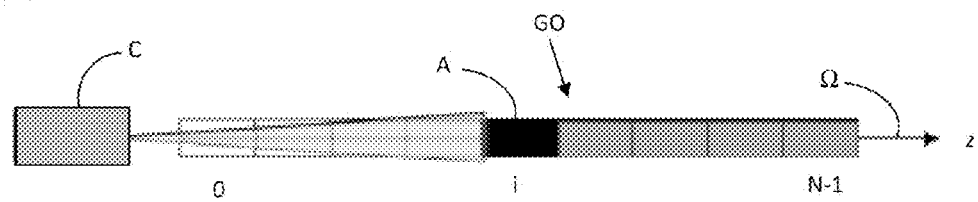
FIG. 2, the notion of occupancy grid.

Hereinafter, $\Omega$ will denote a spatial benchmark with one, two or three dimensions; an occupancy grid GO is a partition of a continuous and bounded subset of $\Omega$ into a number N of parts, dubbed cells and designated by an index $i \in [0, N-1]$. The cell of index i is indicated by $c_i$. Without loss of generality, we shall consider hereinafter a one-dimensional occupancy grid observed by a single distance sensor C (or a plurality of co-located sensors), the index i increasing as the sensors get further away ($c_0$ therefore being the cell closest to the sensor and $c_{N-1}$ the one furthest away). This configuration is illustrated by FIG. 2.

An obstacle A is a bounded continuous subset of $\Omega$. A cell $c_i$ is said to be occupied by an obstacle A if $A \cap c_i \neq \emptyset$, to be not occupied by A if $A \cap c_i = \emptyset$. Stated otherwise, if the obstacle covers the cell even partially, the latter is considered to be occupied. Other conventions are possible, but in any event a cell must be either free, or occupied.

For each of the cells of the grid, we consider the binary random experiment "state" which can have one of the two outcomes {occupied; vacant} consisting in knowing whether or not the cell contains an obstacle. The state of the cell $c_i$ will be denoted $e_i$, $o_i$ will denote the realization $e_i$=occupied and $v_i$ will denote the realization $e_i$=vacant. In a grid, it is considered that all the cells are independent, so that $$\forall i,j \in [0,N-1], P(o_i \hat{} o_j) = P(o_i) \cdot P(o_j) \qquad (1)$$

where $\hat{}$ is the logical operator "and" and $P(\cdot)$ denotes the probability of an event (not to be confused with a probability density, designated by a lower case "p").

It is also considered that the position of the obstacles can only be known with the aid of uncertain distance sensors, characterized by a probabilistic model such as described above which may be written in a more general manner $p(z|\vec{x})$, $\vec{x}$ being the position of an obstacle (in several dimensions, it is a vector, expressed in cartesian, spherical, polar coordinates, etc. and not a simple scalar). These sensors may be telemetric lasers (also called lidars), sonars, infrared radars, flight-time cameras, etc.

A measurement z arising from a sensor makes it possible to determine the probability of occupancy $P(o_i|z)$ of a cell $c_i$. For a given measurement z, the set of probabilities $P(o_i|z)\forall i \in [0, N-1]$ constitutes the inverse model of the sensor on the grid. Whilst the direct model of the sensor advises regarding the response of the sensor as a function of the material world, the inverse model expresses the impact of the measurement on the occupancy grid which is the model of the material world that is adopted, thereby justifying the term inverse model.

Figure 3:
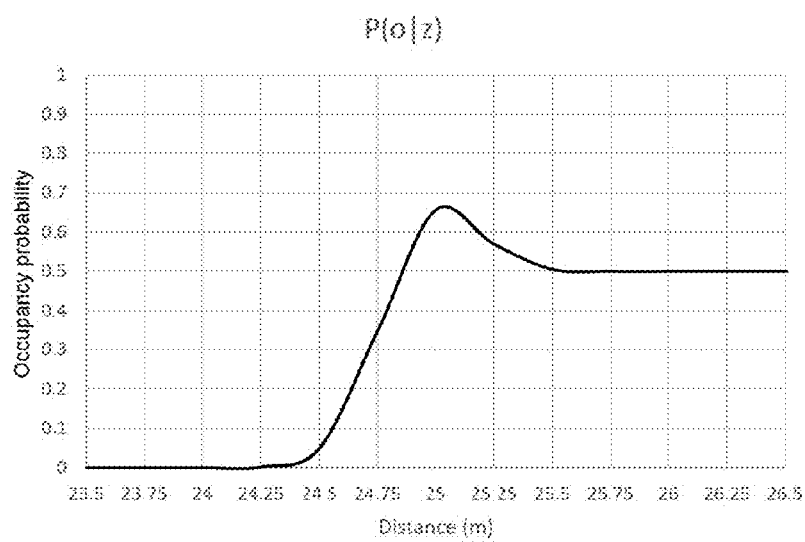
FIG. 3, the notion of "inverse" model of a distance sensor.

FIG. 3 presents a typical example of inverse model of a distance sensor, in a case where z=25 m. It may be verified that the occupancy probability is quasi-zero for the cells which are situated a distance of less than 24.25 m from the sensor and attains a peak for a distance of 25 m (corresponding to the measurement provided by the sensor). Beyond 25 m, the occupancy probability decreases until it stabilizes at a value of 0.5, indicative of a total ignorance of the occupancy state of the cells which, being situated beyond the obstacle, are masked by the latter and therefore inaccessible to the sensor.

In accordance with the usage which prevails in the literature, FIG. 3 represents the inverse model by means of a smoothed curve. A more correct representation would be to display only the points corresponding to the limits of the cells of the grid: indeed, it is not possible to distinguish a "partially" occupied cell from another which would be "totally" occupied, in all cases the distance to the obstacle will be estimated as being the distance to the corresponding cell. This is the spatial error introduced by the grid.

Figure 4:
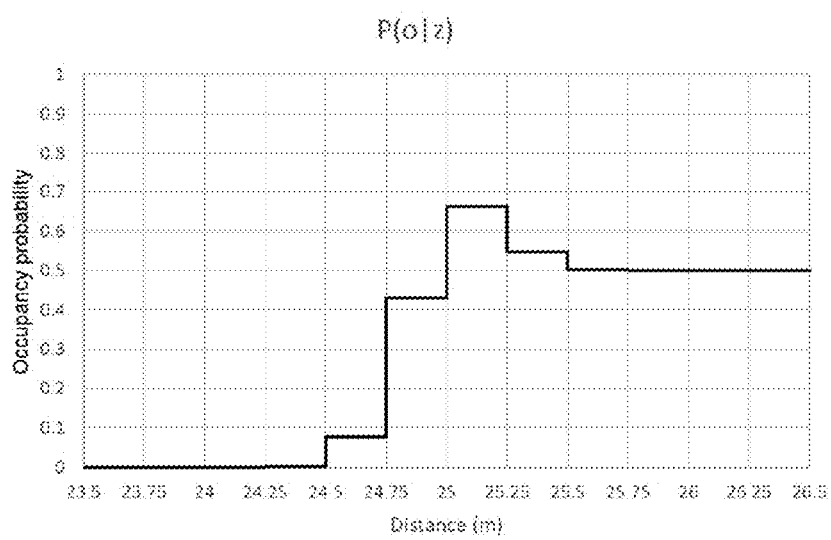
FIG. 4, the spatial discretization of an inverse model on an occupancy grid.

A more apposite version of the inverse model of FIG. 3, taking account of this spatial discretization induced by the grid is presented in FIG. 4.

It should be stressed that the notions of "occupancy" and of "obstacle distance" are not entirely equivalent. Indeed, saying that an obstacle is at a sensor distance z does not signify only that a certain cell is occupied, but also that all the other cells of the grid that are closer to the sensor are free (otherwise, the first obstacle would have been seen at a distance of less than z). In the aforementioned FIG. 2, the obstacle A is situated in the cell of index i (black); the cells of index less than i are represented as white to indicate that they are free, those of index greater than i are represented as gray to indicate that their occupancy state is unknown.

If the notion of uncertain sensor characterized by its (direct) model $p(z|\vec{x})$ is taken into account and if $d_i$ denotes the distance of the cell $c_i$ with respect to the measurement point and $\vec{x}_l$ denotes the closest point of the cell $c_i$ to said measurement point, we have:

$$\sqrt{} \qquad (2)$$

Equation (2) indicates that the model of the sensor evaluated at a point which is on the boundary of a cell of the grid ($x_i$) is equal to the probability density of response of the sensor for a corresponding grid configuration, namely a grid where the cells closer than cell i are vacant, cell i is occupied, and the occupancy states of the cells further away than cell i are not determined. It is by utilizing this information that A. Elfes, in the aforementioned article thereby, has proposed a method for constructing the inverse model of the sensor. An explanation of this method is given hereinbelow.

Bayes' theorem makes it possible to express the inverse model of a sensor $P(o_i|z)$ in the following manner:

$$P(o_i | z) = \frac{p(z|o_i)P(o_i)}{p(z)} = \frac{p(z|o_i)P(o_i)}{p(z|o_i)P(o_i) + p(z|v_i)P(v_i)}. \qquad (3)$$

where $P(o_i)$ and $P(v_i)$ designate the a priori probabilities (that is to say without knowing the position of the obstacles, or the output of the sensor) that the cell $c_i$ is occupied or free, respectively. Hereinafter, we will make the assumption $P(o_i)=P(v_i)=1/2$, but a generalization does not pose any fundamental theoretical difficulty.

We then obtain:

$$P(o_i | z) = \frac{p(z|o_i)}{p(z|o_i) + p(z|v_i)} \qquad (4)$$

The computation of the terms $p(z|o_i)$ and $p(z|v_i)$ can be done by using Kolmogorov's theorem over all the possible configurations of the grid. A configuration is formed by an N-tuple $\{e_0, e_1 \ldots e_{N-1}\}$ where $e_i \in \{o_i, v_i\}$; a grid of N cells has $2^N$ possible configurations.

For the term $p(z|o_i)$ the possible grid configurations are of the form $G_{o_i}^k = (e_0, \ldots e_{N-1})$ where cell i is occupied; there are $2^{N-1}$ such grids. For the term $p(z|v_i)$ the possible grid configurations are of the form $G_{v_i}^k = (e_0, \ldots e_{N-1})$ where cell $c_i$ is vacant; there are $2^{N-1}$ such grids.

It is therefore possible to write:

$$p(z|o_i) = \sum_{G_k^{o_i}} p(z|G_k^{o_i}) P(G_k^{o_i}) \qquad (5a)$$

$$p(z|v_i) = \sum_{G_k^{v_i}} p(z|G_k^{v_i}) P(G_k^{v_i}) \qquad (5b)$$

The terms $P(G_{o_i}^k)$ and $P(G_{v_i}^k)$ equal $1/2N^{-1}$. By using equation (2) relating the occupancy and the measured distance, it is possible to determine, on the basis of a grid configuration $G_{e_i}^k$, the position $\vec{x}_i$ such as $p(z|G_{e_i}^k)=p(z-\vec{x}_k)$. This position is that of the occupied cell of the configuration $G_{e_j^i}^k$ closest to the observer. Equations (5a) and (5b) can therefore be rewritten:

$$p(z | e_i) = \sum_{G_k^{e_i}} \frac{p(z | \vec{x_k})}{2^{N-1}} \qquad (6)$$

whose terms can be computed directly on the basis of the direct model of the sensor. By feeding (6) back into (4) we can therefore compute, in principle, the inverse model of the sensor on the occupancy grid considered.

The main limitation of this procedure stems from the exponential explosion of the number of terms in the sum of equation (6), making it practically impossible to compute the sum. Indeed, in the prior art, analytical expressions for the inverse model are generally used, not involving expressing it directly as a function of $p(z|o_i)$. This implies the loss of the relationship with the direct model, which is the only one to be directly accessible by experiment, and therefore of the capacity to measure the error introduced by the modeling.

A first provision of the present invention is a simplified procedure for computing the inverse model—linear in N instead of being exponential—without introducing any approximation with respect to the use of equations (6) and (4). Hereinafter will shall consider, with an aim of simplifying the disclosure but without loss of generality, the case of a one-dimensional occupancy grid, where the position of an obstacle is represented by a scalar variable x and for which (6) can be written:

$$p(z | e_i) = \sum_{G_k^{e_i}} \frac{p(z | x_k)}{2^{N-1}} \qquad (7)$$

As we are considering a one-dimensional grid with N cells, $x_k$ can take only the position value of one of the cells $c_j$ with $j \in [0; N-1]$. Thus, the terms of the sum (7) can take only N different values. By factorizing all the grids giving the same value of $p(z|x_k)$, it is therefore possible to reduce equation (7) to a sum of N terms only—instead of $2N^{-1}$. The complexity of the computation goes from exponential to linear.

Figure 5A:
FIGS. 5A to 5D, a procedure for computing the inverse model of a sensor on an occupancy grid.
Figure 5B:

We begin by considering the case $e_i = o_i$. We fix $c_i$ in its occupied state and we fix the distance of the first obstacle as being that of the cell $c_k$, so that this distance is actually $x_k$. We therefore seek the number of grids which are such that the first obstacle is seen at the position $x_k$ knowing that the cell ci is occupied. Three typical cases can be envisaged:

1. k<i: the cell k is occupied (1 cell), the cells $c_j$ with j<k are vacant (k cells), the cell $c_i$ is occupied (1 cell), the others are either occupied, or vacant. This is illustrated in FIG. 5A, where a free cell is represented in white, an occupied cell in black and a cell which is in an indeterminate state in gray. We therefore have k+2 cells in a fixed state and N−k−2 cells in an indeterminate state; there are $2^{N-k-2}$ such grids.
2. k=i (cf. FIG. 5B): the cell k=i is occupied (1 cell), the cells $c_j$ with j<i are vacant (i cells), the others are either occupied, or vacant. This makes 1+i cells whose state is fixed and N−i−1 cells whose state is indeterminate. In all there exist $2^{N-i-1}$ such grids.
3. k>i: this configuration is impossible, since if k were strictly greater than i, the closest obstacle would be seen at xi and not at $x_k$.

Equation (7) in the case $e_i = o_i$ may therefore be written:

$$p(z | o_i) = \sum_{k=0}^{i-1} \frac{p(z | x_k)}{2^{k+1}} + \frac{p(z | x_i)}{2^i} \qquad (8)$$

Figure 5C:
Figure 5D:
Figure 6A:
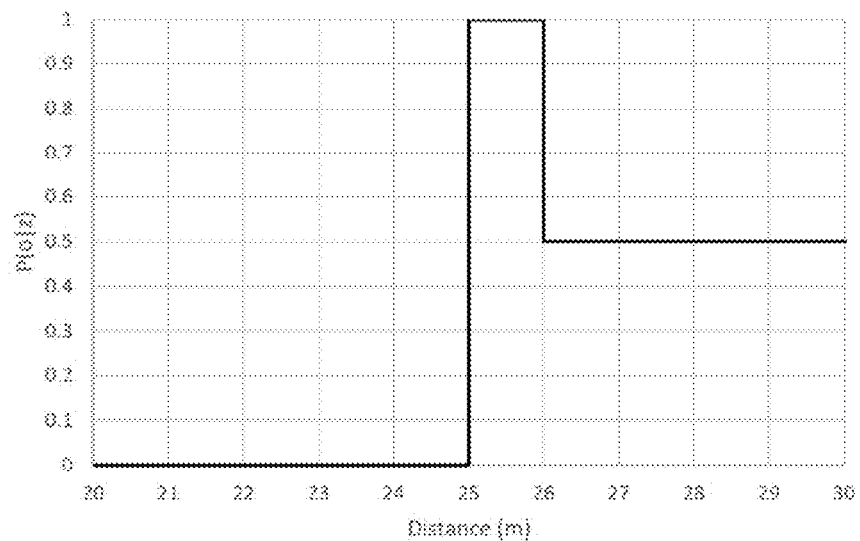
FIGS. 6A to 6D, a procedure for choosing the optimal spatial resolution of an occupancy grid.
Figure 6B:
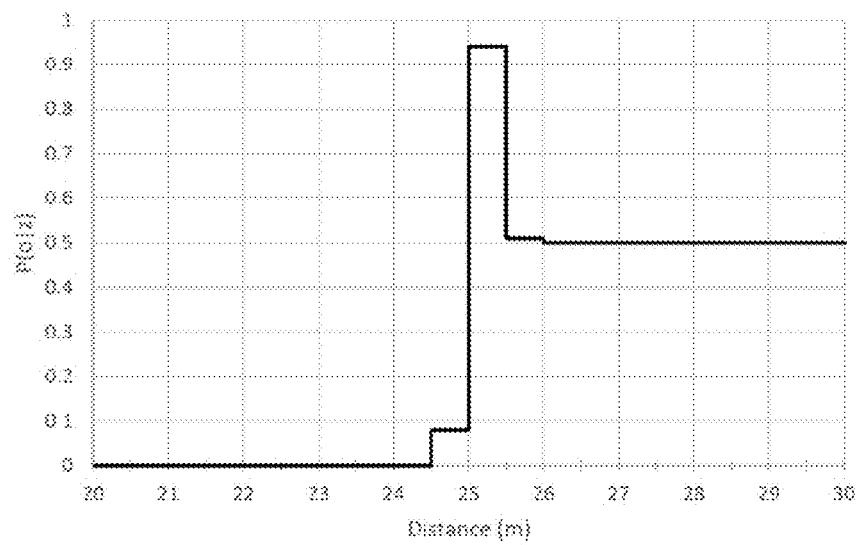
Figure 6C:
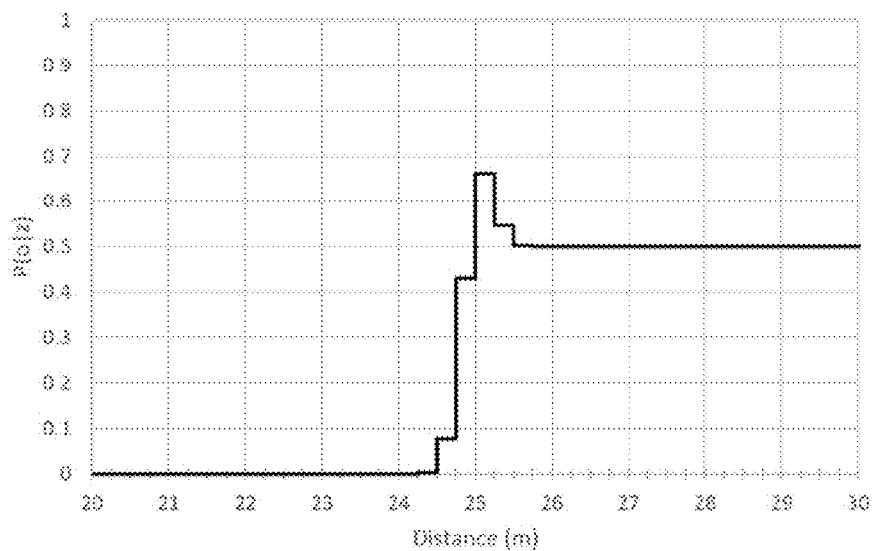
Figure 6D:
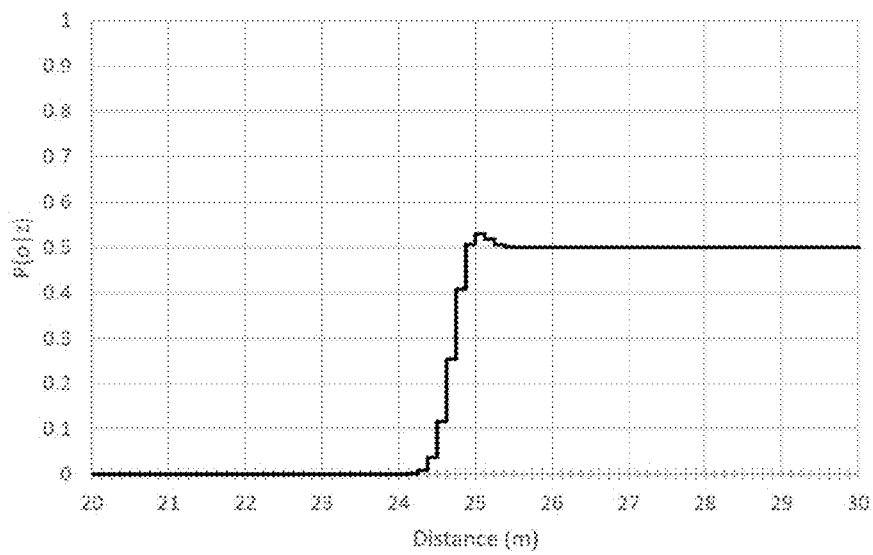

It is possible to repeat the same reasoning for the case $e_i = v_i$. In this case also it is possible to distinguish three possibilities:

1. k<i—situation represented in FIG. 5C: there are $2^{N-k-2}$ cells which satisfy this condition;
2. k=i: impossible situation;
3. k>i—situation represented in FIG. 5D: there are $2^{N-k-2}$ cells which satisfy this condition.

Equation (7) in the case $e_i = v_i$ may therefore be written:

$$p(z | v_i) = \sum_{k=0}^{i-1} \frac{p(z | x_k)}{2^{k+1}} + \sum_{k=i+1}^{N-1} \frac{p(z | x_k)}{2^k}. \qquad (9)$$

By feeding expressions (8) and (9) into (4), one thus succeeds in constructing the one-dimensional inverse sensor model on the occupancy grid on the basis of its direct model with linear complexity with respect to the size N of the grid:

(10)

Such simplifications are also possible in greater dimension, by using polar or spherical coordinates in particular.

The construction of the inverse model depends greatly on the definition of the grid. It is therefore interesting to study the impact of a variation of spatial resolution on the inverse model. FIGS. 6A-6D show the inverse models of one and the same sensor on four different spatial resolution grids: 1 m (6A), 50 cm (6B), 25 cm (6C), 12.5 cm (6D). It may be noted that as the resolution increases (the spacing of the grid decreases), the maximum of the inverse model decreases and tends to 0.5. Indeed, one should not expect to be able to know the position of an obstacle with a higher precision than that of the sensor. On the contrary, if one is content to know the occupancy with a much lower precision than that of the sensor, then the presence or absence of an obstacle can be determined with great certainty (case of FIG. 6A, where the maximum of the inverse model equals 0.999994). These considerations make it possible to optimize the spatial resolution of the grid: it is indeed possible to carry out an exploration making it possible to determine the maximum resolution of the grid for which the maximum of the inverse model remains greater than a threshold (strictly greater than 0.5 and strictly less than 1) considered to be "significant".

It is interesting to note that the relationship existing between the precision of the sensor and the resolution of the grid is apparent only if the inverse model is computed on the basis of the direct model (equations 7-10). This relationship is lost if one is content with an approximate analytical expression for the inverse model, as in the prior art; this constitutes an additional advantage of the approach proposed by the invention.

On the basis of the inverse models of two sensors on one and the same occupancy grid, the fusion of the data of the two sensors is performed with the aid of the following equation:

$$P(o_i | z_1 \wedge z_2) = \frac{P(o_i | z_1) P(o_i | z_2)}{P(o_i | z_1) P(o_i | z_2) + (1 - P(o_i | z_1))(1 - P(o_i | z_2))} \quad (11)$$

where $z_1$ and $z_2$ are the measurements provided by the two sensors (the generalization to more than two sensors is immediate—it suffices to consider $P(o_i|z_1 \wedge z_2)$ as the inverse model of a "virtual" sensor and to fuse it with the measurement provided by a third sensor, and so on and so forth. Equation (11) is valid only if $P(o_i)=P(v_i)=1/2$, but its generalization to other assumptions is trivial.

This floating-point computation must be performed for each cell of the grid and at a frequency at least as fast as the acquisition frequency of the sensors—thus requiring considerable computational power.

A second provision of the invention consists of a method for the Bayesian fusion of the data arising from multiple sensors in an occupancy grid without floating-point computation, thereby making it possible to considerably reduce the complexity of the computations required for the construction of occupancy grids and thus to address more varied application fields, especially those for which the embedded computational capacity is very limited.

This aspect of the invention rests upon representing the probability on the interval [0; 1] in a discretized manner, by way of probability classes identified by integer indices.

In what follows, a countable subset of [0; 1], whose elements pn can therefore be characterized by a relative integer index "n", will be called a "system of probability classes" $S=\{p_n, n \in \mathbb{Z}\}$. If the data fusion function expressed by equation (11) hereinabove is called "F", we can write:

$$F(p_1, p_2) = \frac{p_1 p_2}{p_1 p_2 + (1 - p_1)(1 - p_2)}. \quad (12)$$

A particularly interesting case is that of a system of classes such that the result of the fusion of two probability classes of the system also belongs to the system; formally: $\forall p_i, p_j \in S, F(p_1, p_2) \in S$. One then speaks of an "error-free" system of classes, since the fusion does not introduce any error or approximation. It is therefore possible to label the probability values by the indices of the corresponding classes, and the result of a fusion is also identified by an index. The fusion problem then amounts to determining an appropriate function $F_d$ which, with two integer indices, associates another integer index. Formally:

$$\forall (k,l) \in \mathbb{Z}^2, \exists i \in \mathbb{Z} : F(p_k, p_l) = p_i$$

and we write $F_d(k,l) = i$.

The computation of $F_d(k,l) = i$ requires only the knowledge of the indices k and l and of integer index arithmetic; no floating-point computation is necessary for computing the fusion of the information $p_k$ and $p_l$. Moreover, if the system of classes is considered, the index obtained with the aid of $F_d(k,l)$ designates a probability value that is strictly identical to that obtained—using floating-point numbers—by applying equation (11). The procedure thus allows the fusion of the probability classes free of error with respect to a floating computation.

It is possible to generalize this approach by considering the case where the system S is constructed as being the union of several sub-systems of classes which, individually, are error-free. In this case it is possible that the system S considered as a whole may not be error-free. It is therefore necessary to introduce an approximation step into the definition of the fusion function $F_d$:

$$\forall (k,l) \in \mathbb{Z}^2, \exists i \in \mathbb{Z} : F(p_k, p_l) = p \text{ and } p_i \leq p < p_{i+1}$$

It is thereafter possible to round by default, by excess or to the nearest possible, and therefore to choose $F_d(k,l)=i$ or $F_d(k,l)=i+1$ according to the approximation model. However, the error remains bounded by the width of the support of the system of classes.

A trivial example of an error-free system is $S=\{1/2, 1\}$. Any system of classes comprising probabilities different from 1/2, 1 and 0 necessarily comprises an infinity of elements. In practice, for obvious implementational reasons, only systems of probability classes of finite cardinality will be considered. However, given that the sensors are finite in number and that their outputs (quantized and digitized) can take only a finite number of values, it is proven that it is possible to carry out "error-free" fusions even on the basis of systems of probability classes of finite cardinality.

Figure 7A:
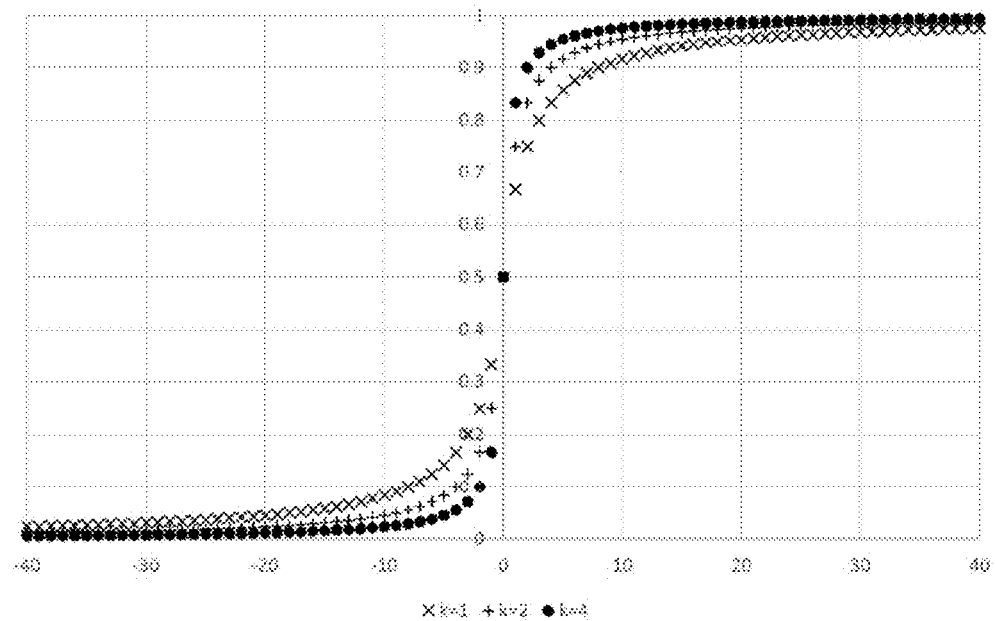
FIGS. 7A and 7B, diverse systems of probability classes.

A first exemplary applicational benefit relates to a system of probability classes formed by the union of the following two error-free sub-systems of classes:

$$S_k^- = \left\{ \frac{1}{2 - k \cdot n}, n \leq 0 \right\} \quad (13)$$

$$S_k^+ = \left\{ \frac{k \cdot n + 1}{k \cdot n + 2}, n \geq 0 \right\} \quad (14)$$

where k is a positive integer ($k \in \mathbb{N}^*$) as well as the system $S_k = S_k^+ \cup S_k^-$, which is not error-free. FIG. 7A illustrates these systems of probability classes in the cases k=1, k=2 and k=4. It may be observed that the systems $S_k$ quantize the interval [0, 1] in a non-uniform manner, with a quantization spacing which is large near the value 0.5 and smaller and smaller on approaching the values 0 and 1. This is doubly advantageous, since:

a probability of 0.5 indicates uncertain occupancy; it is therefore not useful to be very precise around this value; on the other hand, precision is useful in proximity to the extreme values 0 and 1;

beyond a certain value of |n|, the various values of the probability classes $p_n$ get extremely close together; the error introduced by truncating the systems of classes is therefore negligible.

It is preferable to choose a low value for k (for example not greater than 5) so as to prevent only the probabilities very close to 0 or to 1 being finely sampled. In fact, the more precise the sensor, the higher the value of k can be.

The inverse model of FIG. 4 was spatially discretized, but the probability of occupancy of each cell was able to take any value lying in the interval [0,1]. At present, the probability values are themselves discretized, or quantized, so as to belong to the system of classes $S_k$ (more generally, to a system of classes S). Thus, in accordance with the invention, it is necessary to approximate the probability values of the inverse model of FIG. 4 by elements of a system of classes S.

Figure 8:
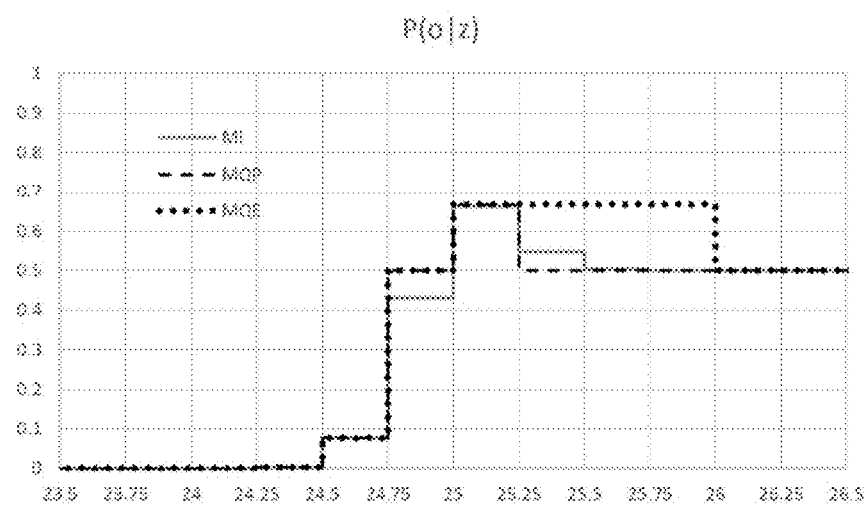
FIG. 8, two procedures for quantizing an inverse model of a sensor on an occupancy grid.

A first possibility consists in replacing the values of the inverse model—represented by the curve MI in FIG. 8—with the closest elements of S, so as to minimize the quantization error. The result, in the case where the system of probability classes is $S_1$ ($S_k$ with k=1), is represented by the curve MQP in this same FIG. 8. It is seen that this approach may lead to under-estimating the probability of occupancy of a cell, which might not be acceptable in an obstacle detection application. An alternative consists in approximating the values of the theoretical inverse model by the smallest upper bound of the system of classes S (curve MQE in FIG. 8, still in the case of the system $S_k$). Thus the occupancy probability is never under-estimated, which may be an advantage for the detection of obstacles. In other applications, such as people counting, this type of approximation may on the other hand lead to the generation of false-positives.

It is noted that, whatever the type of approximation considered, the spatially discretized inverse system (curve MI in FIG. 8) takes a very small number of values (7 in the example of FIG. 8, at the very most 18 if we took the maximum resolution of the grid, depending on the error of the sensor). Consequently, the number of elements of the system S which are required in order to approximate it by the inverse model is also very small. It is therefore possible to limit oneself to the consideration of a finite subset, of small size, of the system of classes $S_k$ whose cardinality is, in principle, infinite and countable.

It was shown above, with reference to FIGS. 6A-6D, that—for a given sensor—the more resolved the spatial occupancy grid, the closer to 0.5 is the maximum value of the inverse model. However, if one limits oneself to probability values belonging to a system of classes S, there exists a probability class $p_{min}$ which corresponds to the smallest value greater than 0.5. In the case of $S_1$, we have $p_{min}=p_1=2/3$; more generally, for a system of classes $S_k$, $p_{min}=p_1=(k+1)/(k+2)$. The optimal resolution of the occupancy grid is therefore that for which the maximum value of the inverse model is equal to $p_{min}$. Any subsequent decrease of the spacing of the grid increases the computational load without providing any gain in terms of information.

As was explained above, the benefit of using systems of probability classes of the type of $S_k$ is that the data fusion requires only computations on the indices "n", and therefore on integers.

The case of $S_k^-$ is considered first. Let i, j<0∈ℤ. By substituting (13) into (12) and by performing simple computations, it is found that:

$$F(p_i,p_j)=p_{i+j-k\cdot ij} \tag{15}$$

The case of $S_k^+$ is considered first. Let i, j>0∈ℤ. By substituting (14) into (12) and by performing simple computations, it is found that:

$$F(p_i,p_j)=p_{i+j+k\cdot ij} \tag{16}$$

If i=0, the probability $p_i$ is equal to 0.5 and then $F(p_i, p_j)=p_j$: a sensor for which the occupancy probability is 0.5 does not provide any information.

There remains the case where one of the probabilities to be fused is less than 0.5—and therefore pertains to the class $S_k^-$—and the other is greater than 0.5—and therefore pertains to the class $S_k^+$. In this case we have:

$$F(p_i, p_j) = p_n, n = \frac{i+j}{1+k\cdot j} \text{ if } i<0, j>0 \text{ and } |i| \geq |j|; \tag{17}$$

$$F(p_i, p_j) = p_n, n = \frac{i+j}{1-k\cdot j} \text{ if } i<0, j>0 \text{ and } |i| \leq |j|. \tag{18}$$

The computation of the integer fractions does not, in general, give an integer result. It is possible, however, to implement an integer division operation "÷", delivering an integer result—the index of a probability class whose value is close to the real result. The above equation then becomes:

$$F(p_i,p_j)=p_{(i+j)\div(1+k\cdot j)} \text{ if } i<0, j>0 \text{ and } |i|\geq|j|; \tag{19}$$

$$F(p_i,p_j)=p_{(i+j)\div(1-k\cdot i)} \text{ if } i<0, j>0 \text{ and } |i|\leq|j|. \tag{20}$$

The error introduced by applying equations (19) and (20) is bounded by the maximum distance between two successive classes. The two classes of maximum distance are $p_0$ and $p_1$, consequently the maximum error is given by $$E(k)=p_1-p_0=k/(2k+4) \tag{21}$$

It is noted that the situation considered here entails the two sensors giving contradictory information; in certain cases, it will be preferred not to apply equations (19), (20), but a rule for managing conflicts, which may be known from the prior art. For example, especially when needing to avoid potentially dangerous collisions, it may be preferable to take the highest estimation of occupancy probability; in this case we therefore have simply:

$$F(p_i,p_j)=\max(p_i,p_j) \tag{22}$$

Another exemplary system of classes exhibiting applicational benefit can be defined by recurrence.

Let p be an occupancy probability lying strictly between 0.5 and 1:$0.5<p<1$. The series $p_n$ is then defined by recurrence in the following manner:

$$\begin{aligned} p_0 &= 0.5; \\ p_1 &= p; \\ p_2 &= F(p, p); \\ p_3 &= F(p_2, p); \\ &\ldots \\ p_{n+1} &= F(p_n, p) \end{aligned} \tag{23}$$

The definition of $p_n$ is thereafter extended to negative integer values of n in the following manner:

$$\begin{aligned} p_0 &= 0.5; \\ p_{-1} &= 1 - p; \\ p_{-2} &= F(p_{-1}, p_{-1}); \\ p_{-3} &= F(p_{-2}, p_{-1}); \\ &\ldots \\ p_{n-1} &= F(p_n, p_{-1}) \end{aligned} \tag{24}$$

Thereafter, we define the following two systems of classes, with parameter p∈]0.5, 1[:

$$G_p^+=\{(p_n),n\geq 0\} \tag{25}$$

$$G_p^-=\{(p_n),n\leq 0\} \tag{26}$$

where $p_n$ is defined by (22) or (23), depending on whether n is positive or negative. By construction, the classes $G_p^-$ and $G_p^+$ are error-free. Indeed, if $f_p$ denotes the function in one variable which, with a probability x, associates $f_p(x)=F(x,p)$, it is immediately seen that $\forall i\in\mathbb{N}^*$, $p_i=f_p^i(p)$, where the exponent "i" signifies "composed i times with itself". Consequently:

$$F(p_i,p_j)=F(f_p^i(p),f_p^j(p))=F_p^{i+j}(p)=p_{i+j} \tag{27}$$

It is deduced therefrom that $G_p^+$ is error-free. By noting that $\forall x, y \in [0,1]$ we have $F(1-x, 1-y)=1-F(x,y)$, the same reasoning can be applied to $G_p^-$, which is therefore also error-free.

By putting $G_p = G_p^- \cup G_p^+$, a new system of classes is obtained that can be used in a data fusion procedure according to the invention. What is noteworthy is that—unlike the system $S_k$ defined above, $G_p$ is error-free over the whole of its defining set.

Equation (27) makes it possible to find the formula for fusing the classes in $G_p$:

$$F_d(i,j) = i+j \, \forall i,j \in \mathbb{Z} \quad (28)$$

Moreover, the parameter p makes it possible to finely control the error introduced by the quantization; indeed if we put $p=1/2+\varepsilon$, we have:

$$E(p) = p_1 - p_0 = \varepsilon \quad (29)$$

The system $G_p$ is very interesting since it makes it possible to carry out the whole fusion in the simplest possible manner (an integer addition) and error-free, and to curb the error introduced by the quantization by the choice of the parameter p.

Figure 7B:
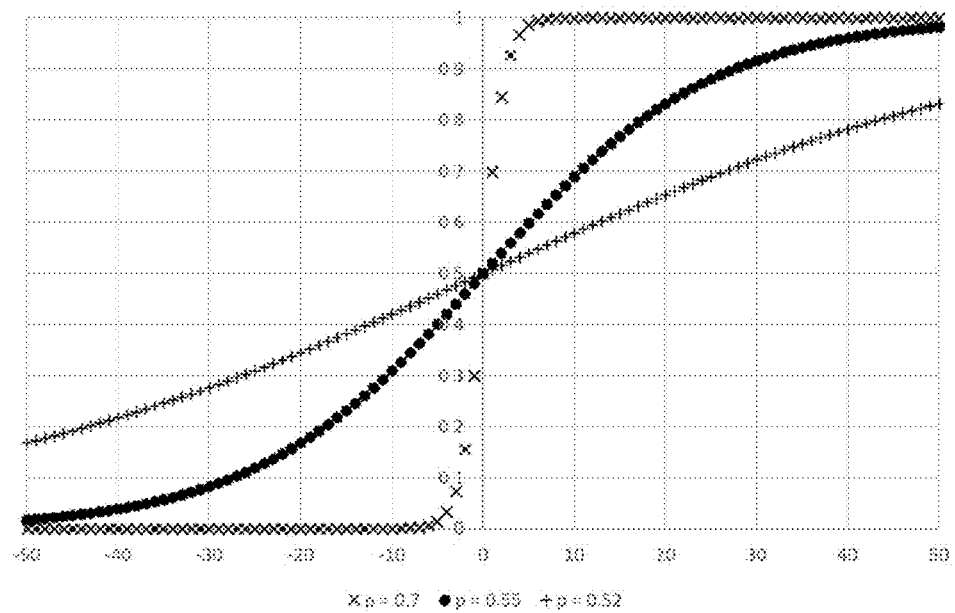

FIG. 7B illustrates the system $G_p$ for three values of the parameter p: 0.52; 0.55 and 0.7.

Figure 9A:
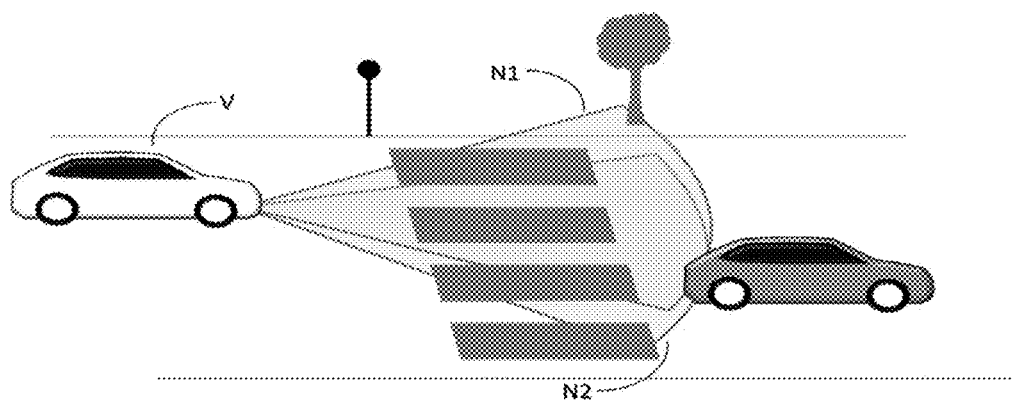
FIGS. 9A and 9B, a system for perceiving obstacles according to a first embodiment of the invention.

FIG. 9A illustrates the application of the invention to a terrestrial vehicle V equipped with a distance sensor C, for example a mechanical-scanning laser telemeter (LIDAR). This sensor is configured to perform a plurality of one-dimensional scans of the space in front of the vehicle, each scan defining an acquisition "sheet". Preferably, a plurality of sheets N1, N2 . . . is produced, at different heights. During each scan, the sensor produces a vector of measurements z, each measurement of which is indicative of the presence of an obstacle—pedestrian, other vehicle, tree on the edge of the road . . . —in a respective direction and of its distance (for example, when z takes its maximum value, this signifies that there is no obstacle detected within the sensor's range limit). As a variant, a plurality of co-located sensors (that is to say having the same origin point for the distance measurement) can make it possible to produce a plurality of acquisition sheets simultaneously.

Figure 9B:
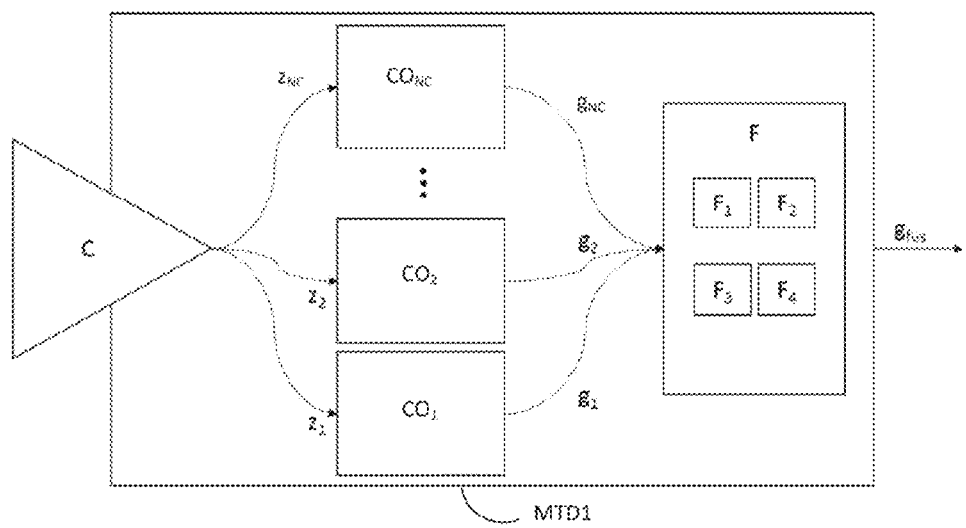

FIG. 9B illustrates a system for perceiving obstacles which is suitable for this application. This system comprises said sensor C (or a set of colocated sensors) and a data processing module MTD1 receiving as input the vectors of measurements corresponding to each acquisition sheet of the sensor and delivering at its output a signal (typically a vector of integers) representative of an occupancy grid obtained by fusing the data of these acquisition sheets.

In the embodiment of FIG. 9B, the data processing module MTD1 comprises a plurality of hardware blocks for computing occupancy probabilities, $CO_1 \ldots CO_{NC}$ and a hardware block for so-called consolidation or fusion computation F. Each block for computing occupancy probabilities $CO_k$ comprises a memory storing, in the form of a correspondence table, an inverse model of the sheet of index k of the sensor C, discretized by means of a system of probability classes, for example $S_1$. One speaks here of "inverse model of the sheet" since it is the measurements of the various sheets that are fused. If just one sensor is used to acquire several sheets, this single sensor is in fact equivalent to a plurality of sensors each acquiring a sheet, and each having its own inverse model (even if all these inverse models may be identical).

Each processing block $CO_k$ therefore receives as input the measurements corresponding to a respective acquisition sheet $z_k$ (references $z_1 \ldots z_{NC}$), and delivers as output an occupancy grid, in the form of a vector of integers $g_k$ representing the indices of the probability classes associated with the various cells of the grid. Thus, the grid $g_k$ encloses the occupancy information estimated with the aid of the measurements of the sheet k alone, that is to say of the vector of measurements $z_k$.

The consolidation hardware block F comprises four combinatorial logic circuits $F_1$, $F_2$, $F_3$ and $F_4$ implementing equations (15), (16), (19) and (20) respectively; it receives at its input the occupancy grids $g_1 \ldots g_{NC}$ and delivers at its output a "consolidated" occupancy grid, represented in its turn by a vector of integers, indices of the probability classes associated with the various cells of this consolidated grid.

As was explained above, equations (19) and (20) might not be implemented; thus blocks $F_3$ and $F_4$ may be absent, or be replaced with circuits for managing detection conflicts, for example, implementing the rule expressed by equation 21 (choice of the maximum probability).

If the inverse models associated with the various acquisition sheets are identical, the blocks $CO_1 \ldots CO_{NC}$ are also identical, and can be replaced with a single hardware block for computing occupancy probabilities, performing the processings in a sequential manner.

The data processing module MTD1 can also be associated with distance sensors of any other type.

Figure 10A:
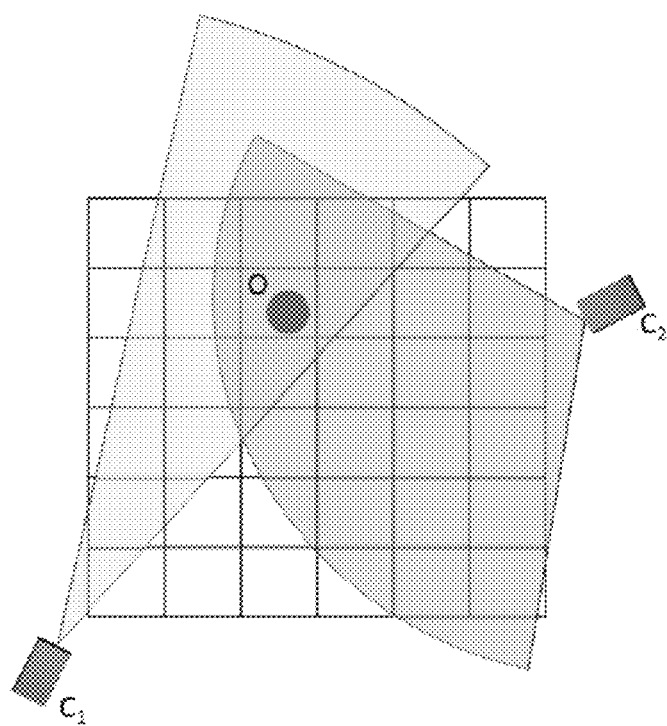
FIGS. 10A and 10B, a system for perceiving obstacles according to a second embodiment of the invention.
Figure 10B:
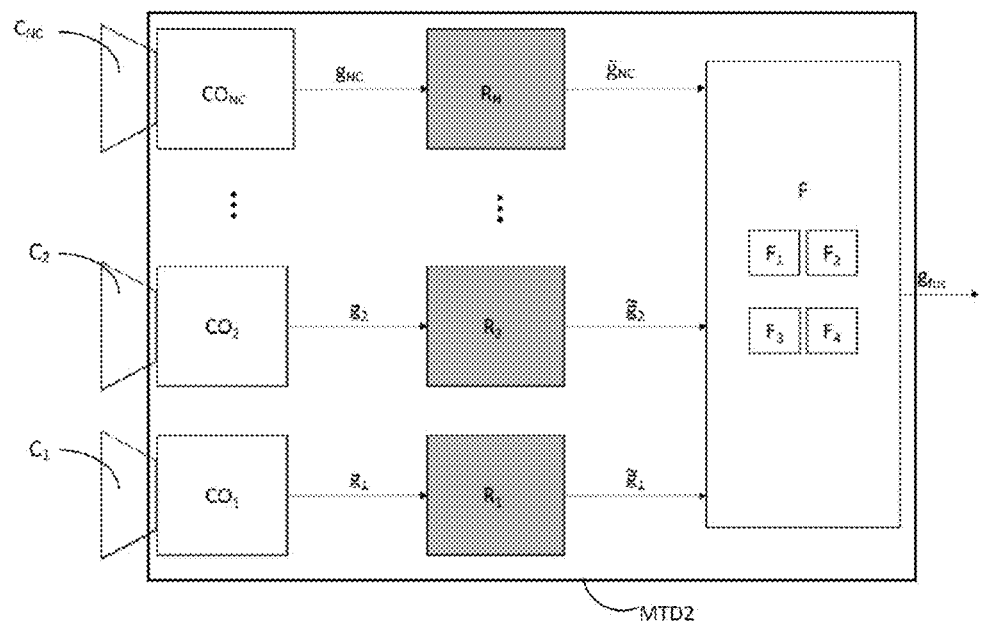

FIGS. 10A and 10B pertain to another embodiment of the invention, using several sensors disposed at different locations which cooperate to provide an occupancy grid constructed with the aid of measurements performed from various viewpoints. The sensors can be technologically heterogeneous, in terms of precision, range, field of vision and/or speed of acquisition. In this embodiment the distance of the first obstacle is an item of information relating to the sensor which makes the measurement. A schematic example of the scenario is represented in FIG. 10A, showing two sensors $C_1$ and $C_2$ placed at various positions and having different ranges and fields of vision. Thus the obstacle O is seen at completely different distances by $C_1$ and $C_2$.

In this embodiment, the main difficulty resides in the fact that the occupancy grid on the one hand and the sensors on the other hand each have their own inherent frame associated therewith. Thus, the evaluation of the location of the obstacles makes it necessary to perform changes of frame.

FIG. 10B illustrates a system for perceiving obstacles according to such an embodiment of the invention. This system comprises, in general, "NC" non-co-located and potentially heterogeneous sensors $C_1, C_2 \ldots C_{NC}$ and a data processing module MTD2. The latter differs from the data processing module MTD1 of FIG. 9B in that it also comprises, inserted between the hardware blocks for computing occupancy probabilities $CO_1 \ldots CO_{NC}$ and the consolidation hardware block F, of change-of-frame blocks $R_1 \ldots R_{NC}$. Each of these blocks $R_k$ contains computation, generally floating-point, units for performing the change from the frame of a respective sensor to the frame of the so-called "consolidation" occupancy grid with respect to which the data fusion is performed. The computation performed for the change of frame consists in reassigning the occupancy of a location known in the frame of a sensor $C_k$ (expressed by a vector of integers $g_k$) to the corresponding cell in the frame of the consolidation grid. The vectors of integers representative of the occupancies of the cells of the consolidation grid are represented by $\tilde{g}_1 \ldots \tilde{g}_{NC}$. This reassignment assumes the computation of translations, rotations, etc. The processing of the blocks $R_k$ can for example be carried out using a floating arithmetic unit of an embedded processor (FPU: Floating Point Unit). In this case one and the same hardware block can perform the computation for the set of blocks $R_k$ (sequential processing).

As a variant, the equations for changing frame can be held in conversion tables stored in memories contained in the modules $R_k$. Thus, even in this case, it is possible to circumvent the floating-point computation and only perform operations on integers. On the other hand, these conversion tables may be fairly voluminous and their storage may have a non-negligible cost in terms of silicon surface area.

Figure 11:
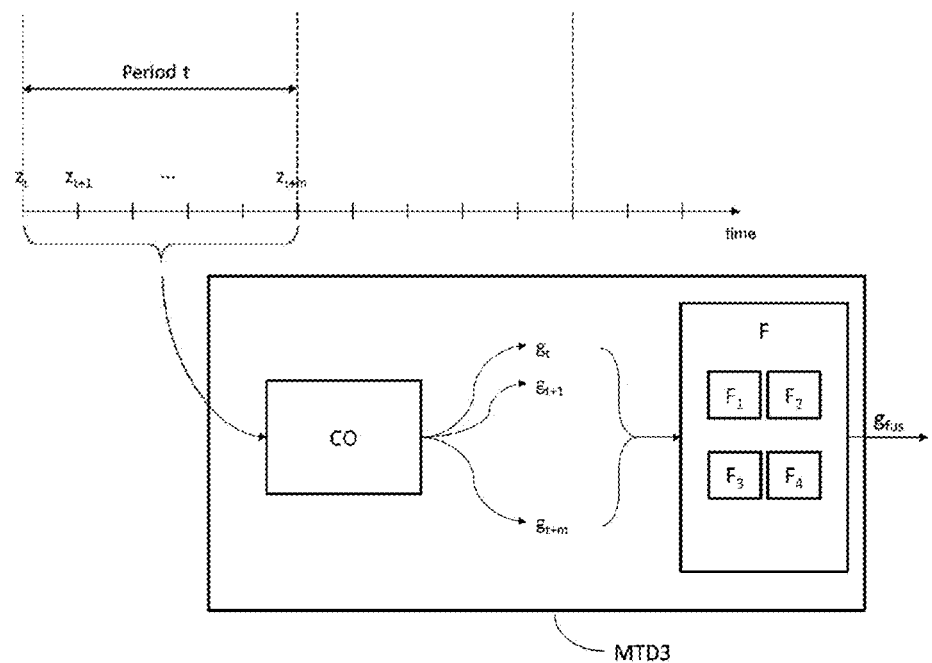
FIG. 11, a system for perceiving obstacles according to a third embodiment of the invention.

FIG. 11 illustrates a third embodiment of the invention in which a single sensor C, not represented, acquires scalar or vector measurements $z_t, z_{t+1}, \ldots z_{t+m} \ldots$ at an acquisition rate N times higher than is required for a determined application. A hardware block for computing occupancy probabilities CO produces an occupancy grid $g_t, g_{t+1}, \ldots g_{t+m} \ldots$ for each of these measurements. Next, a hardware fusion block F fuses N of these grids, acquired at successive instants, into a single consolidated grid $g_{fus}$; the consolidated occupancy grids $g_{fus}$ are therefore generated at a rate N times lower than the sensor application rate. For example, if the sensor C operates at a rate of 100 Hz and a rate of 10 Hz suffices for the envisaged application, it is possible to fuse 10 successive acquisitions.

In the embodiments of FIGS. 9B, 10B and 11 we have considered the case where the processings—or at least some of them—are carried out by hardware computation blocks, that is to say dedicated digital circuits. However, the invention also lends itself to a totally or partially software implementation, in which the processings—or at least some of them—are carried out by an aptly programmed generic processor.

The invention claimed is:

1. A method for perceiving physical bodies (O) comprising the following steps, implemented by a computer or a dedicated digital electronic circuit (MTD1, MTD2):
   a) acquisition of a plurality of distance measurements ($z_1 \ldots z_{NC}$) of said physical bodies, arising from one or more sensors ($C_1 \ldots C_{NC}$);
   b) application, to each said distance measurement, of an inverse model of the corresponding sensor on an occupancy grid (GO) providing a discretized spatial representation of an environment of said sensor, so as to determine a probability of occupancy by a physical body of a set of cells of said occupancy grid; and
   c) construction of a consolidated occupancy grid, each cell of which exhibits an occupancy probability computed by performing Bayesian fusion of the occupancy probabilities determined during step b);
   wherein each said inverse sensor model is a discrete model, associating with each cell of the corresponding occupancy grid, and for each distance measurement, a probability class chosen inside one and the same set of finite cardinality, each said probability class being identified by an integer index; and wherein, during said step c), the probability of occupancy of each cell of the consolidated occupancy grid is determined by means of integer computations performed on the indices of the probability classes determined during said step b), and wherein said set of finite cardinality of probability classes is formed by the union of one or more subsets such that, during said step c), the Bayesian fusion of two probability classes belonging to one and the same subset provides a result also belonging to said subset.

2. The method as claimed in claim 1, wherein said set of finite cardinality of probability classes constitutes a non-uniform discretization of the probability interval [0, 1], with a discretization spacing increasing between 0 and 0.5, and then decreasing between 0.5 and 1.

3. The method as claimed in claim 2, wherein said set, designated by $G_p$, of finite cardinality of probability classes is formed by the union of two subsets $G_p^-$, and $G_p^+$ defined by:

$$G_p^+ = \{(p_n), n \geq 0\}$$

$$G_p^- = \{(p_n), n \leq 0\}$$

the index n taking relative integer values, p being a parameter of value lying strictly between 0.5 and 1 and the probability $p_n$ being defined by recursion in the following manner:

$$p_0 = 0.5;$$

$$p_1 = p;$$

$$p_{n+1} = F(p_n, p) \, \forall n > 1$$

$$p_{-1} = 1 - p;$$

$$p_{n-1} = F(p_n, p_{-1}) \, \forall n < -1$$

and wherein, during said step c), the fusion $F(p_i, p_j)$ between two probability classes $p_i, p_j \in G_p$ is computed by applying the following equation:

$$F(p_i, p_j) = p_{i+j}.$$

4. The method as claimed in claim 1, wherein said set, designated by $S_k$, of finite cardinality of probability classes is formed by the union of two subsets $S_k^-$, and $S_k^+$, defined by:

$$S_k^- = \left\{ p_n = \frac{1}{2 - k \cdot n}, n \leq 0 \right\}$$

$$S_k^+ = \left\{ p_n = \frac{k \cdot n + 1}{k \cdot n + 2}, n \geq 0 \right\}$$

the index n taking relative integer values and the parameter k being a non-zero relative integer, and wherein, during said step c), the fusion $F(p_i, p_j)$ between two probability classes $p_i, p_j \in S_k$ is computed by applying the following equations when the indices "i" and "j" have the same sign:

$$F(p_i, p_j) = p_{i+j-k \cdot i \cdot j} \text{ if } i, j < 0;$$

$$F(p_i, p_j) = p_{i+j-k \cdot i \cdot j} \text{ if } i, j < 0.$$

5. The method as claimed in claim 4, wherein, during said step c), the fusion $F(p_i, p_j)$ between two probability classes $p_i, p_j \in S_k$ is computed by applying the following equations when the indices "i" and "j" have opposite signs:

$$F(p_i, p_j) = p_{(i+j) \div (1+k \cdot j)} \text{ if } i < 0, j > 0 \text{ and } |i| \geq |j|;$$

$$F(p_i, p_j) = p_{(i+j) \div (1-k \cdot i)} \text{ if } i < 0, j > 0 \text{ and } |i| \leq |j|;$$

where the symbol $\div$ designates an integer division.

6. The method as claimed in claim 4, wherein k=1.

7. The method as claimed in claim 1, wherein said step c) comprises the implementation of changes of frame to construct said consolidated occupancy grid on the basis of probabilities of occupancy of cells of occupancy grids associated with non-co-located sensors.

8. The method as claimed in claim 1, also comprising a preliminary step of constructing the inverse models of at least one said sensor on the corresponding occupancy grid, implemented by applying the following equation:

$$P(o_i | z) = \frac{\sum_{k=0}^{i-1} \frac{p(z|x_k)}{2^{k+1}} + \frac{p(z|x_i)}{2^i}}{\sum_{k=0}^{N-1} \frac{p(z|x_k)}{2^k}}$$

where:
- $P(O_i|z)$ represents the probability of occupancy of the cell of index "i" of the occupancy grid, said cells being ordered by increasing distance from said sensor;
- N is the number of cells of said occupancy grid;
- z represents a distance measurement arising from the sensor; and
- $p(z|x_k)$ represents the direct model of the sensor, expressing the probability density of the measurement "z" provided by the sensor when the position $x_k$ of the cell k of the occupancy grid, but no other cell closer to the sensor, is occupied by a physical body.

9. The method as claimed in claim 1, further comprising a preliminary step of determining a spatial resolution of at least one said occupancy grid, said spatial resolution being chosen such that $\max[P(o_i|z_k)] \geq p_{min}$ where $P(o_i|z_k)$ is the inverse model of the sensor and $p_{min}$ is the smallest probability class belonging to said set and greater than 0.5.

10. A system for perceiving physical bodies comprising:
- at least one input port for receiving a plurality of signals $(z_1, \ldots, z_{NC})$ representative of distance measurements of said physical bodies, arising from one or more sensors;
- a data processing module (MTD1, MTD2) configured to receive as input said signals and to use them to construct a consolidated occupancy grid by applying a method as claimed in claim 1; and
- at least one output port for a signal ($g_{fus}$) representative of said consolidated occupancy grid.

11. The system as claimed in claim 10, also comprising one or more distance sensors ($C_1, \ldots, C_{NC}$) adapted to generate signals representative of a plurality of distance measurements of said physical bodies and linked to said input port or ports.

12. The system as claimed in claim 10, wherein said data processing module comprises at least one hardware block for computing occupancy probabilities ($CO_1 \ldots CO_{nNc}$) comprising a memory storing, in the form of a correspondence table, an inverse model of a sensor associating with each distance measurement a vector of integers representing indices of probability classes associated with respective cells of an occupancy grid.

13. The system as claimed in claim 12, wherein said data processing module comprises a hardware block for integer computation, for so-called consolidation (F), configured to receive as input a plurality of integers representing indices of probability classes associated with cells of respective occupancy grids, and to compute an index of a probability class associated with a cell of said consolidated occupancy grid, wherein said data processing module also comprises at least one computation block, for so-called change of frame ($R_1, \ldots, R_{NC}$), configured to:
- receive as input at least one first vector of integers, arising from a corresponding hardware block for computing occupancy probabilities and representing indices of probability classes associated with respective cells of an occupancy grid;
- convert it into a second vector of integers representing indices of probability classes associated with respective cells of another occupancy grid, coinciding spatially with said consolidated occupancy grid; and
- provide said second integer vector as input to said consolidation hardware block.

14. The system as claimed in claim 10, wherein said data processing module comprises a hardware block for integer computation, for so-called consolidation (F), configured to receive as input a plurality of integers representing indices of probability classes associated with cells of respective occupancy grids, and to compute an index of a probability class associated with a cell of said consolidated occupancy grid.

15. The system as claimed in claim 10, wherein said data processing module is configured to receive as input signals ($z_1, \ldots, z_{NC}$) representative of distance measurements acquired successively by one and the same sensor or co-located sensors and to construct a consolidated occupancy grid on the basis of a plurality of these signals, corresponding to successive acquisition instants.

\* \* \* \* \*